United States Patent
Athley et al.

(10) Patent No.: US 12,047,140 B2
(45) Date of Patent: *Jul. 23, 2024

(54) WIRELESS COMMUNICATION NODE ADAPTED TO RADIATE ANTENNA BEAMS OF DIFFERENT TYPES

(71) Applicant: Telefonaktiebolaget LM Ericsson (publ), Stockholm (SE)

(72) Inventors: Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,855

(22) Filed: Feb. 22, 2023

(65) Prior Publication Data

US 2023/0344479 A1 Oct. 26, 2023

Related U.S. Application Data

(63) Continuation of application No. 17/377,818, filed on Jul. 16, 2021, now Pat. No. 11,595,095, which is a (Continued)

(51) Int. Cl.
H04W 72/044 (2023.01)
H04B 7/06 (2006.01)

(52) U.S. Cl.
CPC ........ *H04B 7/0617* (2013.01); *H04W 72/046* (2013.01)

(58) Field of Classification Search
CPC .................................................. H04W 72/046
(Continued)

(56) References Cited

U.S. PATENT DOCUMENTS 10,644,774 B2   5/2020   Athley
2012/0319900 A1   12/2012   Johansson et al.
(Continued)

FOREIGN PATENT DOCUMENTS

CN   103052086   4/2013
CN   103828257   5/2014
(Continued)

OTHER PUBLICATIONS

International Search Report and Written Opinion issued in Application No. PCT/EP2016/056634 dated Nov. 8, 2016, 10 pages.

*Primary Examiner* — Angel T Brockman
(74) *Attorney, Agent, or Firm* — Rothwell, Figg, Ernst & Manbeck, P.C.

(57) ABSTRACT

A wireless communication node comprising an antenna arrangement that is adapted to radiate at least one radiation beam of a first type and at least one radiation beam of a second type. Said at least one radiation beam of the first type has a first type beamwidth ($B_{T1}$) and said at least one radiation beam of the second type has a second type beamwidth ($B_{T2}$) that exceeds the first type beamwidth ($B_{T1}$). Said at least one radiation beam of the first type is arranged for communication with at least a first other node, and where said at least one radiation beam of the second type is arranged for detection of changes in propagation paths for said other node and/or appearances of further other nodes.

20 Claims, 8 Drawing Sheets

Related U.S. Application Data continuation of application No. 16/840,148, filed on Apr. 3, 2020, now Pat. No. 11,070,268, which is a continuation of application No. 15/521,693, filed as application No. PCT/EP2016/056634 on Mar. 24, 2016, now Pat. No. 10,644,774.

(58) Field of Classification Search
USPC .......................................................... 370/329
See application file for complete search history.

(56) References Cited

U.S. PATENT DOCUMENTS

| | | |
|---|---|---|
| 2013/0100869 A1 | 4/2013 | Boch |
| 2014/0148107 A1 | 5/2014 | Maltsev et al. |
| 2014/0177466 A1 | 6/2014 | Inoue et al. |
| 2014/0177561 A1 | 6/2014 | Yu et al. |
| 2015/0208443 A1 | 7/2015 | Jung et al. |
| 2016/0066197 A1 | 3/2016 | Park et al. |
| 2018/0115354 A1 | 4/2018 | Athley et al. |
| 2022/0077905 A1* | 3/2022 | Athley ................. H04B 7/0617 |

FOREIGN PATENT DOCUMENTS

| | | |
|---|---|---|
| CN | 104584325 | 4/2015 |
| CN | 104718712 | 6/2015 |
| WO | 2016141961 | 9/2016 |

* cited by examiner

WIRELESS COMMUNICATION NODE ADAPTED TO RADIATE ANTENNA BEAMS OF DIFFERENT TYPES

CROSS-REFERENCE TO RELATED APPLICATIONS

This application is a continuation of U.S. patent application Ser. No. 17/377,818, filed on Jul. 16, 2021 (now U.S. Pat. No. 11,595,095, issued on Feb. 28, 2023), which is a continuation of Ser. No. 16/840,148, filed on Apr. 3, 2020 (now U.S. Pat. No. 11,070,268, issued on Jul. 20, 2021), which is a continuation of U.S. patent application Ser. No. 15/521,693, which has a section 371 (c) date of Apr. 25, 2017 (now U.S. Pat. No. 10,644,774, issued on May 5, 2020), and which is the U.S. National Stage of International Patent Application No. PCT/EP2016/056634, filed Mar. 24, 2016. The above identified applications and patents are incorporated by this reference.

TECHNICAL FIELD

The present disclosure relates to a wireless communication node comprising an antenna arrangement that is adapted to radiate at least one radiation beam of a first type and at least one radiation beam of a second type.

BACKGROUND

Massive beamforming is regarded as an important technical component for 5G wireless communications. With massive beamforming, hundreds of antenna elements are arranged to be used at the base station (BS) as opposed to only a few antennas in previous systems.

Many beamforming concepts rely on the base station (BS) using a grid-of-beams (GoB) approach. One such approach is that the BS transmits reference signals in a number of beams, herein referred to as beam reference signals (BRS:s), in order to enable a user terminal, user equipment (UE), to measure which beam that is the best/most suitable. Such measurements could be based on, e.g., reference signal received power (RSRP). The UE then reports an index for the best beam, or indices to a number of the best beams to the BS. The RSRP for the corresponding beams could also be reported to the BS. Based on these reports, the BS can decide which beam or beams to use for the data transmission.

The GoB typically consists of a number of predetermined fixed beams with beamforming weights obtained from a, possibly oversampled, DFT (Discrete Fourier Transform) matrix. In order not to lose any information in the data collected by the antenna elements, the number of beams in the GoB should be at least as many as the number of antenna elements. This means that the number of beams in the GoB of a potential massive beamforming system at least could be several hundreds.

With many beams in the GoB, a high number of BRS:s may be required. This could lead to pilot contamination, high consumption of radio resource elements for the pilots, and comprehensive measurement procedures in the UE in order to estimate the best beam or beams to be used for data transmission.

One solution to this problem is to transmit BRSs only in a few beams in the GoB. If the directions to all active UEs are known, the UEs are not moving, and no new UEs enter the system, this could be a viable approach. However, problems will occur if new UEs enter the system and/or established propagation paths suddenly are obstructed due to, e.g., a UE moving behind a building. In such cases, the direction to the new UE or the new dominating propagation path cannot be estimated by means of BRSs if no BRSs are transmitted in those directions. This may lead to that active transmission beams are lost and that new active transmission beams cannot be established for new UEs.

There is thus a need for a wireless communication node that is arranged to handle abrupt changes in dominating propagation paths for existing UEs and the appearance of new UEs in a more efficient and reliable manner than previously known.

SUMMARY

It is an object of the present disclosure to provide a wireless communication node comprising an antenna arrangement and a method for antenna radiation beam control addressing one or more of the aspects stated above.

Said object is obtained by means of a wireless communication node comprising an antenna arrangement that is adapted to radiate at least one radiation beam of a first type and at least one radiation beam of a second type. Said at least one radiation beam of the first type has a first type beamwidth and said at least one radiation beam of the second type has a second type beamwidth that exceeds the first type beamwidth. Said at least one radiation beam of the first type is arranged for communication with at least a first other node, and said at least one radiation beam of the second type is arranged for detection of changes in propagation paths for said other node and/or appearances of further other nodes.

Said object is also obtained by means of a method for antenna radiation beam control, comprising radiating at least one radiation beam of a first type and radiating at least one radiation beam of a second type; wherein said at least one radiation beam of the first type has a first type beamwidth and said at least one radiation beam of the second type has a second type beamwidth that exceeds the first type beamwidth.

The method further comprises: using said at least one radiation beam of the first type for communication with at least a first other node and using said at least one radiation beam of the second type for detection of changes in propagation paths and/or appearances of further nodes.

A number of advantages are obtained by means of the present disclosure. Mainly, beam finding and tracking is enabled in a dynamic environment with abrupt changes in dominating propagation paths for existing nodes, such as UEs, and appearance of new nodes, such as UEs, using a reduced amount of pilots compared to previously known solutions.

According to an example, the antenna arrangement is adapted to change a radiation beam of the second type when an appearance of any other node has been detected by said radiation beam. This change comprises forming at least one radiation beam of the first type that is arranged for communication with said any other node.

According to another example, the change also comprises maintaining a radiation beam of the second type.

In this manner, the desired functionality is maintained.

According to another example, the change also comprises forming at least two radiation beams of the second type.

According to another example, two or more radiation beams of the first type are arranged for communication with each other node in order to enable beam-switching, and/or multi-layer or diversity transmission/reception.

According to another example, the node is arranged to activate a radiation beam of the second type for a region that has been deprived of radiation beams of the first type.

In this manner, the desired functionality is provided in an area where it is needed.

According to another example, the antenna arrangement comprises at least one antenna array of dual polarized antenna elements that are arranged for dual polarization beamforming.

Generation of a GoB with beams having adjustable beamwidths with full PA utilization is enabled in the case of an active antenna array architecture based on dual polarization beamforming (DPBF).

More examples are disclosed in the dependent claims.

BRIEF DESCRIPTION OF THE DRAWINGS

The present disclosure will now be described more in detail with reference to the appended drawings, where.

DETAILED DESCRIPTION

Figure 1:
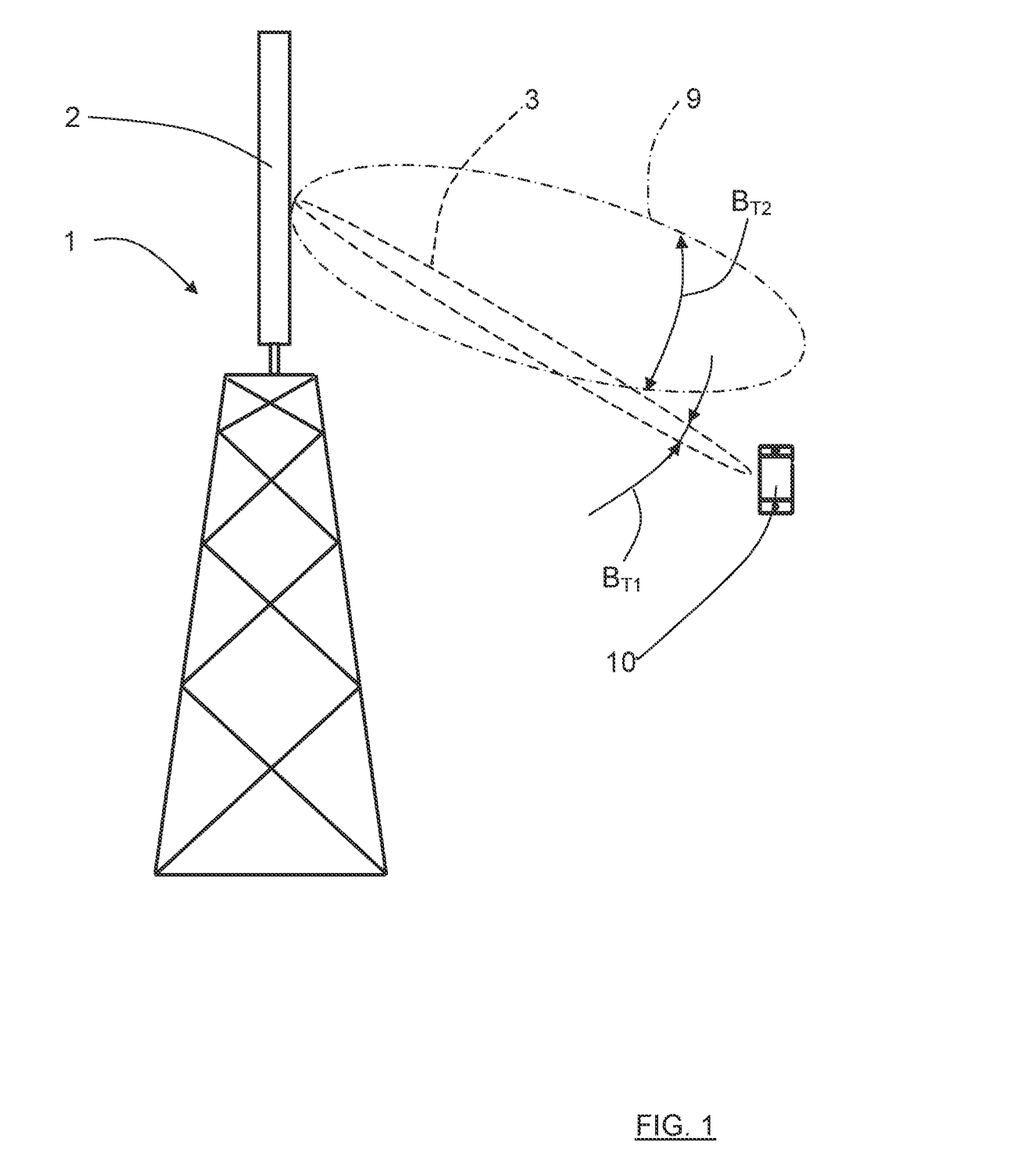
FIG. 1 shows a side view of a wireless communication node.
Figure 2:
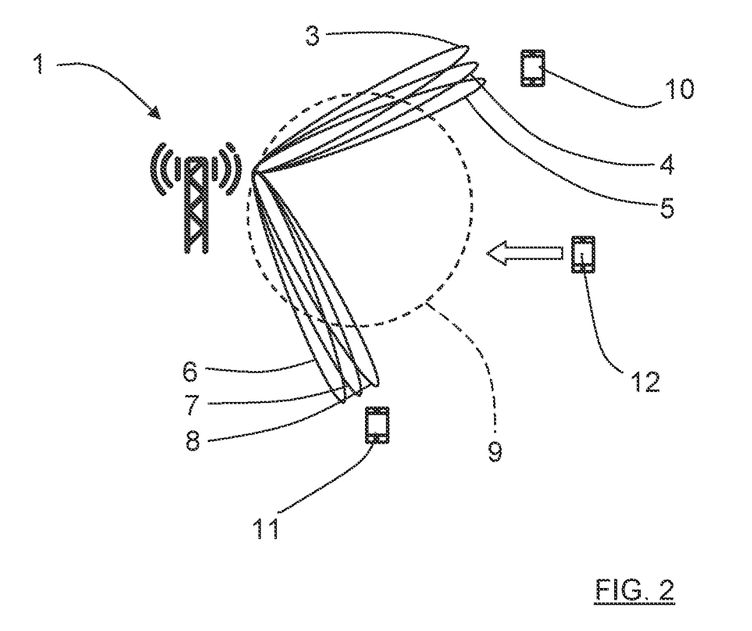
FIG. 2 shows a schematic view of a wireless communication node that communicates with UEs where a new UE appears.

With reference to FIG. 1 and FIG. 2, there is a wireless communication node 1 comprising an antenna arrangement 2 that is adapted to radiate six radiation beams 3, 4, 5; 6, 7, 8 of a first type and one radiation beam 9 of a second type. A first set of three radiation beams 3, 4, 5 are arranged for communication with a first user terminal, user equipment (UE) 10, and a second set of three radiation beams 6, 7, 8 are arranged for communication with a second UE 11.

According to the present disclosure, the radiation beams 3, 4, 5; 6, 7, 8 of the first type has a first type beamwidth BT1 and each one of the radiation beam 9 of the second type has a second type beamwidth BT2 that exceeds the first type beamwidth BT1. The radiation beams 3, 4, 5; 6, 7, 8 of the first type are relatively narrow and arranged for communication with the UEs 10, 11, constituting active radiation beams. A reason for having more than one active beam per UE is to enable beam switching when the UE moves. They can also be used for multi-layer or diversity transmission/reception if the channel conditions are suitable for that. Note that all active beams need not transmit or receive data. An active UE 10, 11 measures RSRP for these beams 3, 4, 5; 6, 7, 8 in order to enable a beam switch if another beam becomes more favorable.

The radiation beam 9 of the second type is constituted by a monitoring beam that has a relatively wide beamwidth and is arranged for detection of changes in propagation paths for the UEs 10, 11 and/or appearances of further other UEs, in FIG. 2 indicated by the appearance of a third UE 12. As indicated in FIG. 2, there are thus three narrow beams 3, 4, 5; 6, 7, 8 per UE 10, 11 that illustrate the active beams where beam reference signals (BRS:s) are transmitted. These can be used to track small movements of the UEs 10, 11 which could lead to a change of best serving beam.

When the third UE 12 requests establishment of data communication it is detected by the radiation beam 9 of the second type, constituting a monitoring beam, since there are now other beams in this area. The third UE 12 can now detect the BRS in the monitoring beam 9 and report reference signal received power (RSRP) to the communication node 1.

Figure 4:
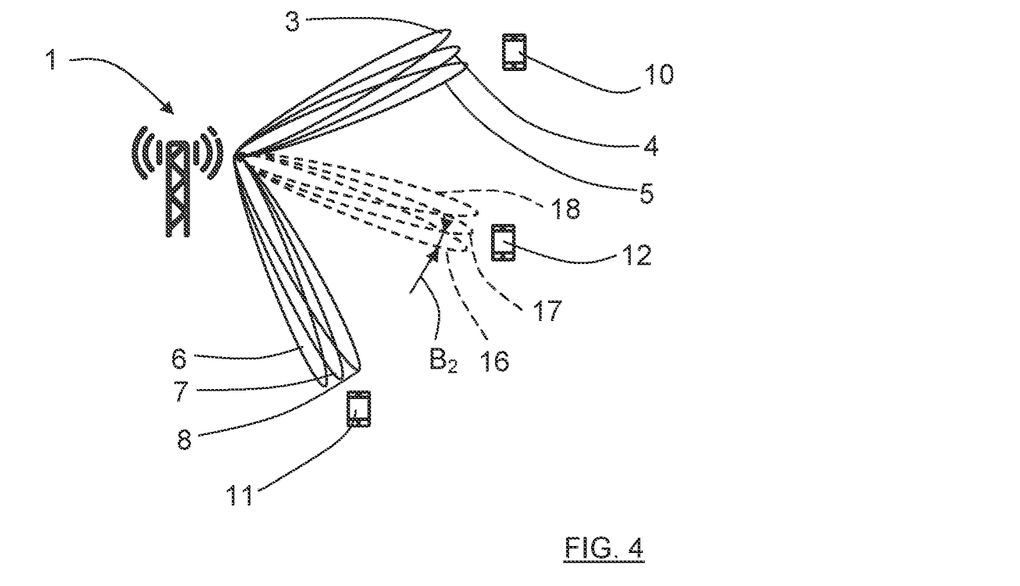
FIG. 4 shows a completed radiation beam change.

According to some aspects, the antenna arrangement 2 is adapted to change the radiation beam 9 of the second type. In this example, as shown in FIG. 4, the change comprises forming three radiation beams 16, 17, 18 of the first type that are arranged for communication with the third UE 12. These radiation beams 16, 17, 18 of the first type are used for subsequent data transmission and beam tracking.

Figure 3:
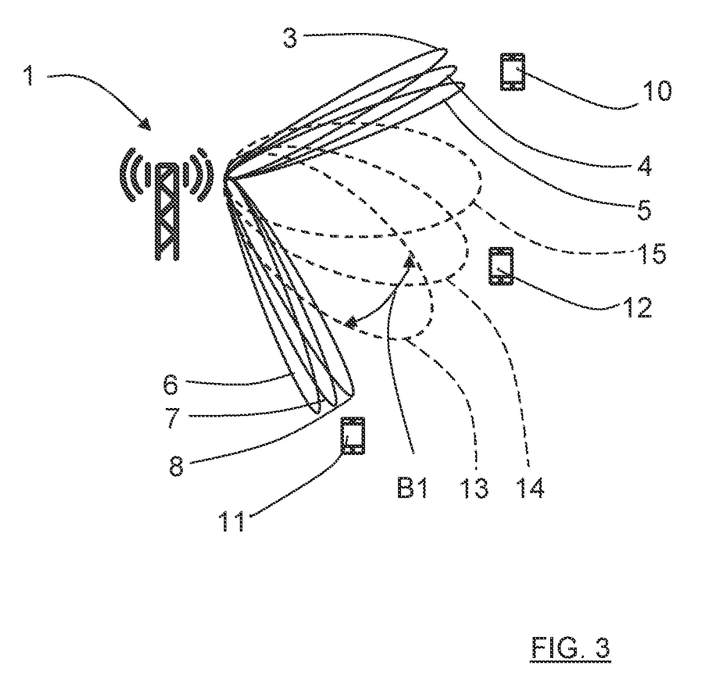
FIG. 3 shows an alternative step for radiation beam change.

This change is according to some aspects performed in steps, as shown also with reference to FIG. 3. Here, the change first comprises forming a plurality of radiation beams 13, 14, 15 having a first beamwidth B1 in order to obtain first direction information for the third UE 12, and then forming the three radiation beams 16, 17, 18 of the first type having a second beamwidth B2 as shown in FIG. 2 in order to obtain second direction information for the third UE 12. The first beamwidth B1 falls below the beamwidth BT2 of the radiation beam 9 of the second type, and the second beamwidth B2 falls below the first beamwidth B1. The accuracy of the second direction information exceeds the accuracy of the first direction information.

To maintain full coverage of BRS:s, two different examples for having additional wide monitoring beams will be described.

Figure 5:
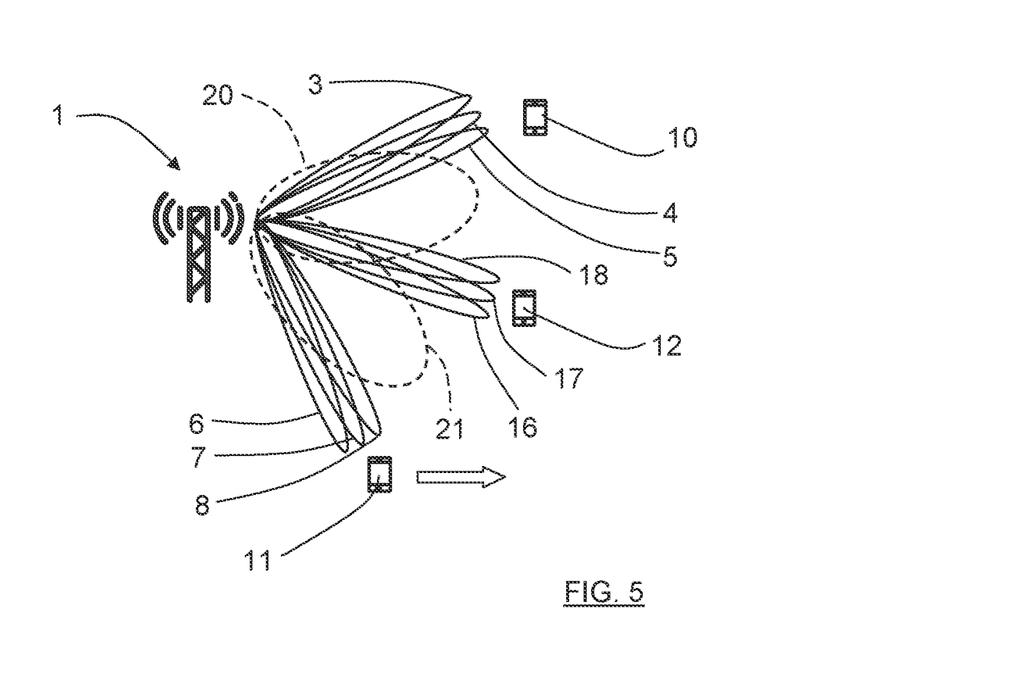
FIG. 5 shows an alternative for radiation beam generation.
Figure 6:
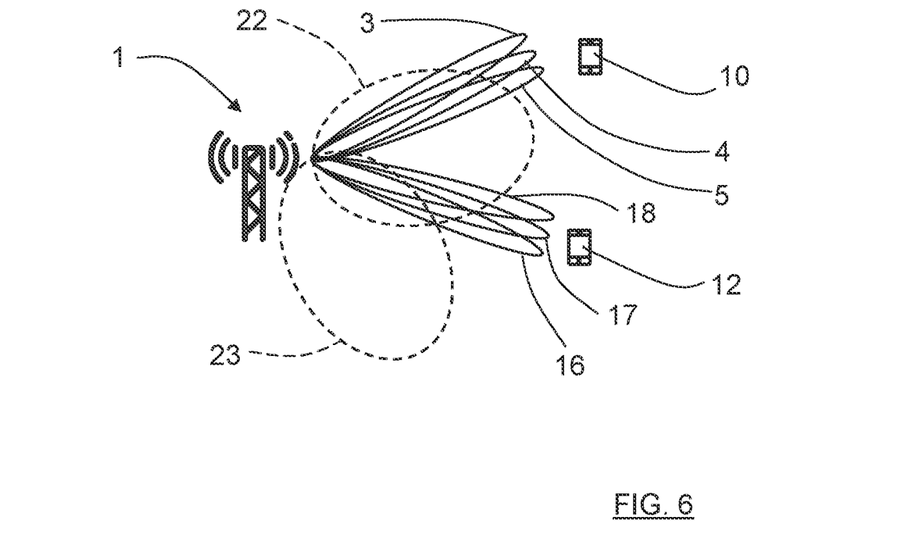
FIG. 6 shows an alternative for radiation beam generation when a UE has left.

As shown in FIG. 5 and FIG. 6, two radiation beams 20, 21; 22, 23 of the second type, i.e. two monitoring beams that do not overlap with the active beams, are formed. The two monitoring beams 20, 21 in FIG. 5 are not as wide as the two monitoring beams 22, 23 in FIG. 6.

Figure 7:
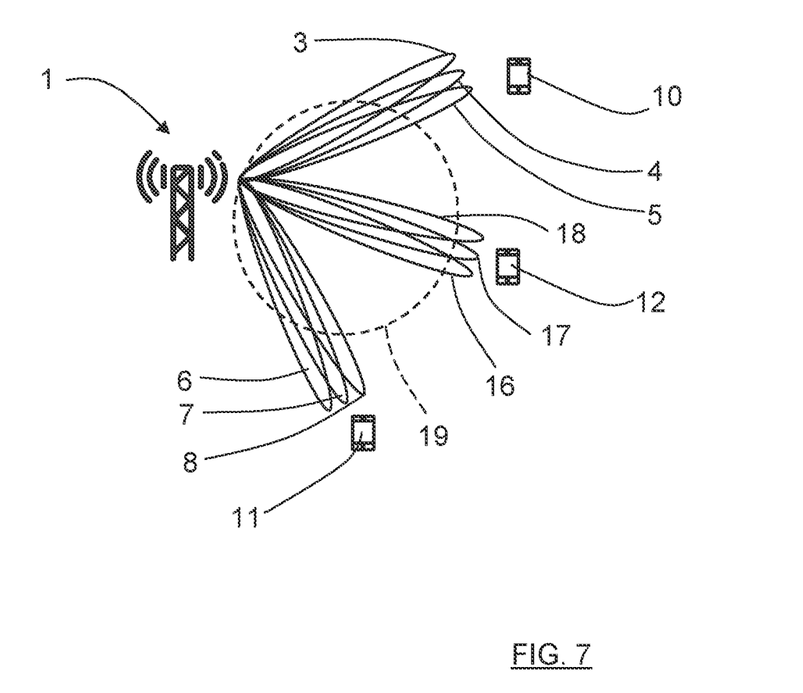
FIG. 7 shows another alternative for radiation beam generation.

As shown in FIG. 7, only one wide beam 19 of the second type is used instead.

In the following a further example will be presented with reference to the FIGS. 8-10.

Figure 8:
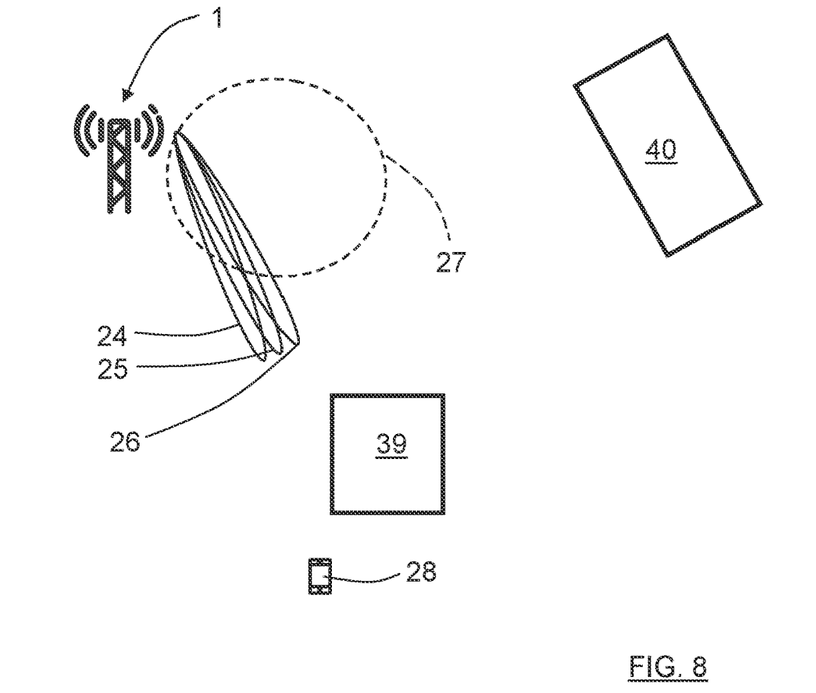
FIG. 8 shows a schematic view of a wireless communication node that communicates with a UE.

With reference to FIG. 8, there is an established data communication between the communication node 1 and a UE 28 using three narrow active beams 24, 25, 26 of the first type, and there is one wide monitoring beam 27 of the second type. Furthermore, there are two buildings, a first building 39 and a second building 40. As shown in FIG. 8, the UE 28 is not obstructed by any of the buildings 39, 40, and data transmission can be performed using the three active beams 24, 25, 26.

Figure 9:
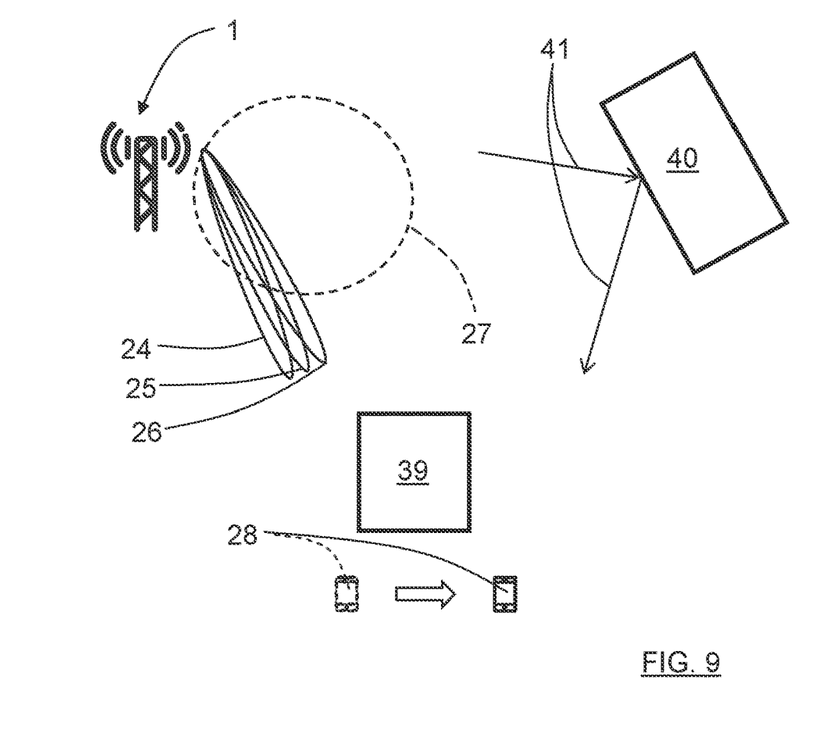
FIG. 9 shows a schematic view of detection of a new propagation path when the UE in FIG. 8 is obscured.

As shown in FIG. 9, the UE 28 moves such that the first building 39 obstructs the UE 28 from the active beams 24, 25, 26. It is here apparent that a reflection path 41 via the second building 40 can be utilized for the data transmission.

This auxiliary propagation path 41 is detected by the UE 28 thanks to the BRS transmitted in the wide monitoring beam 27.

Figure 10:
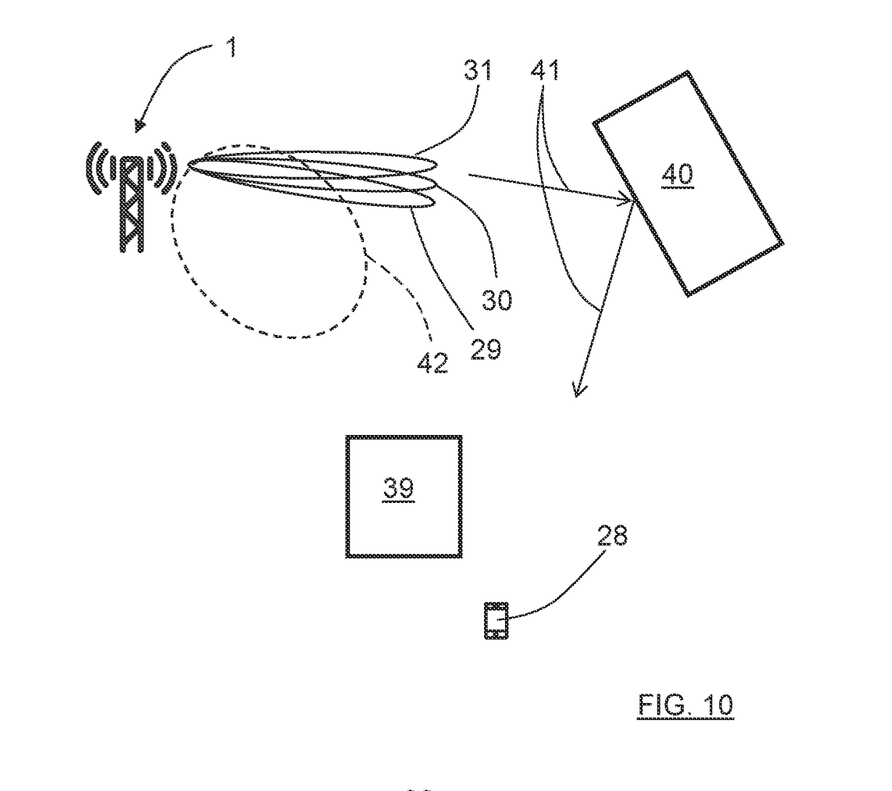
FIG. 10 shows a schematic view of a generated new propagation path.

As shown in FIG. 10, data transmission is now performed by using three new narrow active beams 29, 30, 31 of the first type utilizing the reflection path 41 in building B has been established while the previous active beams 24, 25, 26 have been released and replaced by a new wide monitoring beam 42 of the second type. Generally, the communication node 1 is thus arranged to activate a radiation beam 42 of the second type for a region that has been deprived of radiation beams of the first type 24, 25, 26.

Figure 11:
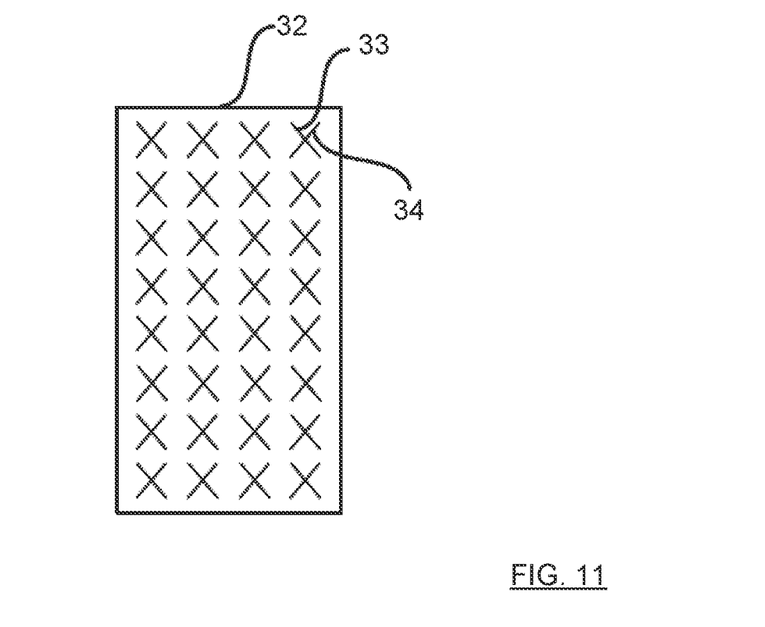
FIG. 11 shows a schematic view of an antenna array of dual polarized antenna elements.
Figure 12:
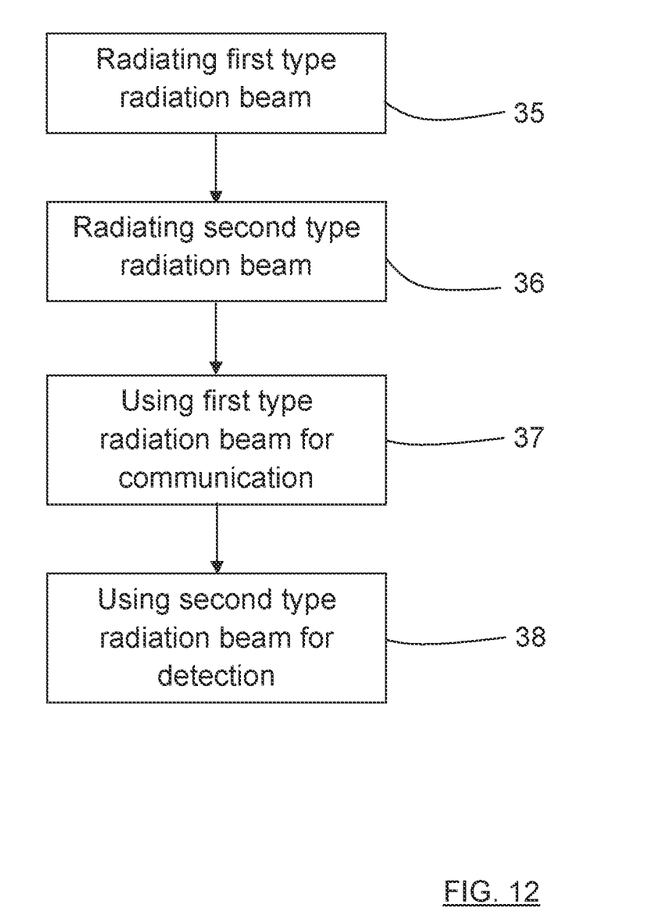
FIG. 12 shows a flowchart for a method according to the present disclosure.

Generating a GoB (Grid of Beams) with beams having adjustable beamwidths is according to an aspect enabled by means of an antenna arrangement 2 of the communication node 1 that is constituted by an active antenna array architecture based on dual polarization beamforming (DPBF). With reference to FIG. 11, the antenna arrangement 2 of the communication node 1 comprises at least one active two-dimensional antenna array 32 of dual polarized antenna elements 33, 34 that are arranged for dual polarization beamforming.

According to an aspect, each element and polarization has its own power amplifier (PA); this architecture enables adjustable beamwidths while maintaining full (PA) utilization in the active antenna array 32.

A method and active antenna array architecture is therefore according to an aspect based on DPBF for beam finding and tracking in a massive beamforming system using GoB. Narrow active beams track UEs with established data communication, while simultaneously having wide monitoring beams to detect changes in dominating propagation paths or the appearance of new UEs. The mix of narrow and wide beams in the GoB is achieved with full PA utilization when using a DPBF active antenna array architecture.

The beam finding and tracking is able to handle abrupt changes in dominating propagation paths for existing UEs and the appearance of new UEs, and is according to some aspects based on generating a GoB where the different beams being of different types that have different beamwidths that are adapted to the current situation. The GoB consists of a simultaneous mix of narrow beams of the first type to cater for data transmission to active UEs and wide beams of the second type to be able to discover new UEs, as in the examples described with reference to FIGS. 2-7, or new propagation paths to already active UEs, as in the example described with reference to FIGS. 8-10. According to an aspect, the narrow beams and the wide beams together give a complete coverage over an entire sector.

The first type beamwidth BT1 is not intended to be regarded as a certain value, but as a beamwidth span since all the radiation beam 3, 4, 5; 6, 7, 8 of the first type do not necessarily have to have identical beamwidths and beamshapes, but where these may differ with a certain span, where this span is defined by the first type beamwidth BT1. The same reasoning is valid for the second type beamwidth BT2, the first beamwidth B1 and the second beamwidth B2. Most importantly the first type beamwidth BT1 is relatively narrow and the second type beamwidth BT2 is relatively wide such that the disclosed beam finding and tracking is enabled as described above.

In this context, according to some aspects and only as an example, a relatively wide beamwidth has a half-power beamwidth that at least is twice as wide as the half-power beamwidth of a relatively narrow beamwidth.

The present disclosure is not limited to the examples above, but may vary within the scope of the appended claims. For example, it is not necessary that massive beamforming such as GoB is used; any type of beamforming that enables the disclosed beam finding and tracking is conceivable.

The number of radiation beams of the first type and the number of radiation beams of the second type may vary. Generally, there is at least one radiation beam of the first type and at least one radiation beam of the second type.

It is not necessary that the antenna arrangement 2 is adapted to radiate more than one active beam per UE, but it is also conceivable that the antenna arrangement 2 is adapted to radiate two active beams per UE or more. As understood from the examples, the antenna arrangement 2 is furthermore adapted to radiate at least one radiation beam 9 of the second type.

It is not necessary that a new radiation beam of the second type is generated after a change where an initial radiation beam of the second type has been changed to one or more radiation beams of the first type, due to for example new UEs that are discovered, or new propagation paths to already active UEs. According to some aspects, possible generation of new radiation beam of the second type depends on other already existing radiation beams of the second type, sector layout, antenna arrangement capacity etc.

The UEs are generally constituted by any type of suitable nodes such as for example any type of user terminals.

The antenna array can be one-dimensional as well as two-dimensional.

Generally, the present disclosure relates to a wireless communication node 1 comprising an antenna arrangement 2 that is adapted to radiate at least one radiation beam 3, 4, 5; 6, 7, 8 of a first type and at least one radiation beam 9 of a second type. Said at least one radiation beam 3, 4, 5; 6, 7, 8 of the first type has a first type beamwidth BT1 and said at least one radiation beam 9 of the second type has a second type beamwidth BT2 that exceeds the first type beamwidth BT1, where said at least one radiation beam 3, 4, 5; 6, 7, 8 of the first type is arranged for communication with at least a first other node 10, 11, and where said at least one radiation beam 9 of the second type is arranged for detection of changes in propagation paths for said other node 10, 11 and/or appearances of further other nodes.

According to an example, the antenna arrangement 2 is adapted to change a radiation beam 9 of the second type when an appearance of any other node 12 has been detected by said radiation beam 9, where the change comprises forming at least one radiation beam 13, 14, 15 of the first type that is arranged for communication with said any other node 12.

According to an example, the change first comprises forming a plurality of radiation beams 13, 14, 15 having a first beamwidth B1 in order to obtain first direction information for said any other node, and then forming a plurality of radiation beams 16, 17, 18 having a second beamwidth B2 in order to obtain second direction information for said any other node 12, where the first beamwidth B1 falls below the second type beamwidth BT2, where the second beamwidth B2 falls below the first beamwidth B1, and where the accuracy of the second direction information exceeds the accuracy of the first direction information.

According to an example, the radiation beams 16, 17, 18 having a second beamwidth B2 are constituted by radiation beams of the first type.

According to an example, the change also comprises maintaining a radiation beam 19 of the second type.

According to an example, the change also comprises forming at least two radiation beams 20, 21; 22, 23 of the second type.

According to an example, two or more radiation beams 3, 4, 5; 6, 7, 8; 16, 17, 18; 24, 25, 26; 29, 30, 31 of the first type are arranged for communication with each other node 10, 11, 12; 28 in order to enable beam-switching, and/or multi-layer or diversity transmission/reception.

According to an example, wherein the node 1 is arranged to activate and/or de-activate one or more radiation beams 6, 7, 8; 16, 17, 18; 24, 25, 26; 29, 30, 31 of the first type in dependence of measured communication properties.

According to an example, the node 1 is arranged to activate a radiation beam 23 of the second type for a region that has been deprived of radiation beams of the first type 6, 7, 8.

According to an example, the antenna arrangement 2 comprises at least one antenna array 32 of dual polarized antenna elements 33, 34 that are arranged for dual polarization beamforming.

Generally, the present disclosure also relates to a method for antenna radiation beam control comprising:
- 35: radiating at least one radiation beam 3, 4, 5; 6, 7, 8 of a first type; and
- 36: radiating at least one radiation beam 9 of a second type; wherein said at least one radiation beam 3, 4, 5; 6, 7, 8 of the first type has a first type beamwidth BT1 and said at least one radiation beam 9 of the second type has a second type beamwidth BT2 that exceeds the first type beamwidth BT1, where the method further comprises:
- 37: using said at least one radiation beam 3, 4, 5; 6, 7, 8 of the first type for communication with at least a first other node 10; and
- 38: using said at least one radiation beam 9 of the second type for detection of changes in propagation paths and/or appearances of further nodes 11, 12.

According to an example, the method further comprises changing a radiation beam 9 of the second type when an appearance of any other node 12 has been detected by said radiation beam 9, where the change comprises forming at least one radiation beam 13, 14, 15 of the first type that is used for communication with said any other node 12.

According to an example, the change first comprises forming a first plurality of radiation beams 13, 14, 15 having a first beamwidth B1 in order to obtain first direction information for said any other node, and then forming a plurality of radiation beams 16, 17, 18 having a second beamwidth B2 in order to obtain second direction information for said any other node 12, where the first beamwidth B1 falls below the beamwidth BT2 of the radiation beam 4 of the second type, where the second beamwidth B2 falls below the first beamwidth B1, and where the accuracy of the second direction information exceeds the accuracy of the first direction information.

According to an example, the radiation beams 16, 17, 18 having a second beamwidth B2 are constituted by radiation beams of the first type.

According to an example, the change also comprises maintaining a radiation beam 19 of the second type.

According to an example, the change also comprises forming at least two radiation beams 20, 21; 22, 23 of the second type.

According to an example, the method comprises using two or more radiation beams 3, 4, 5; 6, 7, 8; 16, 17, 18; 24, 25, 26; 29, 30, 31 of the first type for communication with each other node 10, 11, 12; 28, enabling beam-switching, and/or multi-layer or diversity transmission/reception.

According to an example, the method comprises activating and/or de-activating one or more radiation beams 6, 7, 8; 16, 17, 18; 24, 25, 26; 29, 30, 31 of the first type in dependence of measured communication properties.

According to an example, the method comprises activating a radiation beam 23 of the second type for a region that has been deprived of radiation beams 6, 7, 8 of the first type.

According to an example, the two types of radiation beams are obtained by using dual polarized beamforming for at least one antenna array 32 of dual polarized antenna elements 33, 34.

Figure 13:
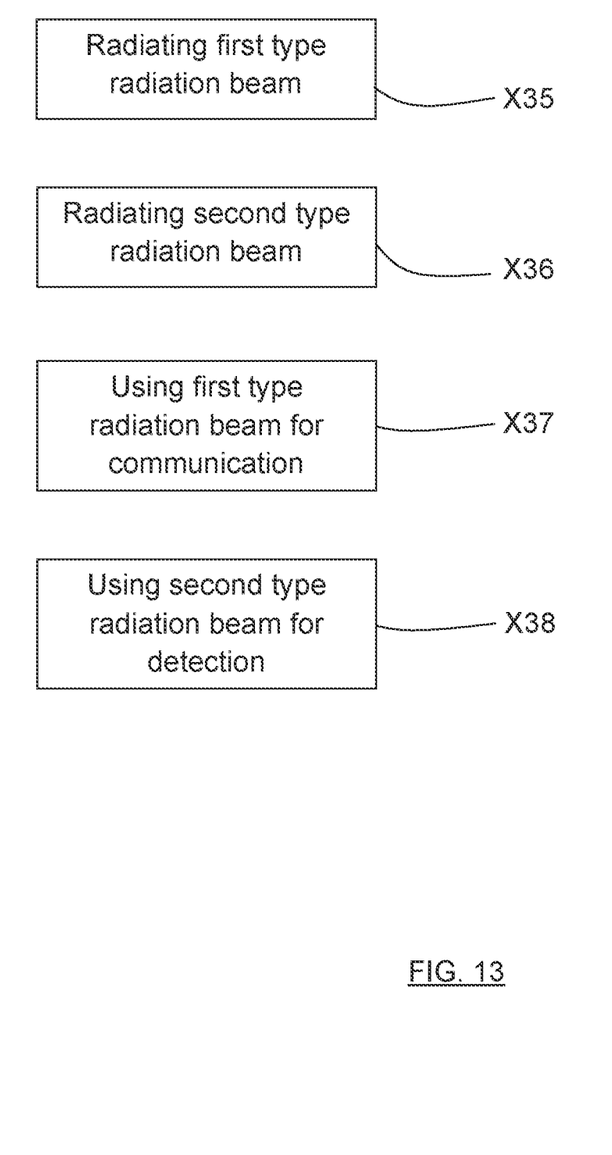
FIG. 13 illustrates a wireless communication node arrangement according to some aspects of the present disclosure.

FIG. 13 shows a wireless communication node arrangement for antenna radiation beam control. The wireless communication node arrangement comprises a first radiating module X35 configured to radiate at least one radiation beam 3, 4, 5; 6, 7, 8 of a first type; a second radiating module X36 configured to radiate at least one radiation beam 9 of a second type, where said at least one radiation beam 3, 4, 5; 6, 7, 8 of the first type has a first type beamwidth BT1 and said at least one radiation beam 9 of the second type has a second type beamwidth BT2 that exceeds the first type beamwidth BT1; a communication module X37 configured to use said at least one radiation beam 3, 4, 5; 6, 7, 8 of the first type for communication with at least a first other node 10; a detecting module X38 configured to use said at least one radiation beam (9) of the second type for detection of changes in propagation paths and/or appearances of further nodes (11, 12).

The invention claimed is:

1. A wireless communication node, the wireless communication node comprising an antenna arrangement, wherein the wireless communication node is configured to:
   employ the antenna arrangement to radiate at least a first set of one or more beams and a second set of one or more beams;
   use one or more beams included in the first set of beams for communication with at least a first user equipment (UE);
   use one or more beams included in the second set of beams to detect a change in a propagation path of the first UE; and
   after detecting the change in the propagation path, forming a third set of one or more beams and using one or more beams included in the third set of beams for communication with the first UE.

2. The wireless communication node of claim 1, wherein the wireless communication node is a network node.

3. The wireless communication node of claim 1, wherein
   each beam included in the first set of beams is narrower than each beam included in the second set of beams, and
   each beam included in the third set of beams is narrower than each beam included in the second set of beams.

4. The wireless communication node of claim 1, further comprising:
   after detecting the change in the propagation path but prior to forming the third set of beams, forming a fourth set of one or more beams and using one or more of the beams included in the fourth set of beams to obtain direction information for the first UE, wherein
   the third set of beam is formed after obtaining the direction information for the first UE.

5. The wireless communication node of claim 4, further comprising replacing the fourth set of beams with the third set of beams.

6. The wireless communication node of claim 5, wherein each beam included in the third set of beams is narrower than each beam included in the fourth set of beams, and each beam included in the fourth set of beams is narrower than each beam included in the second set of beams.

7. The wireless communication node of claim 1, wherein the change in a propagation path of the first UE is caused by a blockage of the propagation path.

8. The wireless communication node of claim 7, wherein the blockage of the propagation path is caused by a movement of the first UE and/or an appearance of an object in the propagation path.

9. The wireless communication node of claim 1, wherein the first set of beams comprises a plurality of beams, the second set of beams consists of a single beam, and each beam included in the first set of beams is narrower than the single beam.

10. The wireless communication node of claim 7, wherein the wireless communication node is a user equipment.

11. A wireless communication node, the wireless communication node comprising an antenna arrangement, wherein the wireless communication node is configured to:
    employ the antenna arrangement to radiate at least a first set of one or more beams and a second set of one or more beams;
    use one or more beams included in the first set of beams for communication with at least a first user equipment (UE);
    use one or more beams included in the second set of beams to detect an appearance of a second UE; and
    after detecting the appearance of the second UE, forming a third set of one or more beams and using one or more beams included in the third set of beams for communication with the second UE.

12. The wireless communication node of claim 11, wherein the wireless communication node is a network node.

13. The wireless communication node of claim 11, wherein
    each beam included in the first set of beams is narrower than each beam included in the second set of beams, and
    each beam included in the third set of beams is narrower than each beam included in the second set of beams.

14. The wireless communication node of claim 11, further comprising:
    after detecting the appearance of the second UE but prior to forming the third set of beams, forming a fourth set of one or more beams and using one or more of the beams included in the fourth set of beams to obtain direction information for the second UE, wherein
    the third set of beam is formed after obtaining the direction information for the second UE.

15. The wireless communication node of claim 14, further comprising replacing the fourth set of beams with the third set of beams.

16. The wireless communication node of claim 15, wherein
    each beam included in the third set of beams is narrower than each beam included in the fourth set of beams, and
    each beam included in the fourth set of beams is narrower than each beam included in the second set of beams.

17. The wireless communication node of claim 11, wherein one or more beams included in the second set of beams is further used to detect a change in a propagation path of the first UE.

18. The wireless communication node of claim 17, wherein
    the change in a propagation path of the first UE is caused by a blockage of the propagation path, and
    the blockage of the propagation path is caused by a movement of the first UE and/or an appearance of an object in the propagation path.

19. The wireless communication node of claim 11, wherein
    the first set of beams comprises a plurality of beams,
    the second set of beams consists of a single beam, and
    each beam included in the first set of beams is narrower than the single beam.

20. The wireless communication node of claim 17, wherein the wireless communication node is a user equipment.

* * * * *